(12) United States Patent
Iatrou et al.

(10) Patent No.: US 8,450,435 B2
(45) Date of Patent: May 28, 2013

(54) INCREASED RUN LENGTH IN GAS PHASE REACTORS

(75) Inventors: John Iatrou, Red Deer (CA); Mark Jay Ziebart, Red Deer (CA); Dale Warren Nagel, Lacombe (CA); Kent Gray Jensen, Red Deer (CA); Benjamin Milton Shaw, Calgary (CA)

(73) Assignee: NOVA Chemicals (International) S.A, Fribeurg (CH)

( * ) Notice: Subject to any disclaimer, the term of this patent is extended or adjusted under 35 U.S.C. 154(b) by 88 days.

(21) Appl. No.: 13/134,340

(22) Filed: Jun. 6, 2011

(65) Prior Publication Data

US 2011/0301308 A1    Dec. 8, 2011

(30) Foreign Application Priority Data

Jun. 7, 2010  (CA) ..................... 2707171

(51) Int. Cl.
| | | |
|---|---|---|
| C08F 4/00 | (2006.01) | |
| C08F 4/44 | (2006.01) | |
| C08F 4/72 | (2006.01) | |
| C08F 10/04 | (2006.01) | |

(52) U.S. Cl.
USPC .......... 526/90; 526/129; 526/170; 526/348.6

(58) Field of Classification Search
USPC ................ 526/129, 90, 170, 348.6
See application file for complete search history.

(56) References Cited

U.S. PATENT DOCUMENTS

| | | |
|---|---|---|
| 3,779,712 A | 12/1973 | Calvert et al. |
| 4,302,565 A | 11/1981 | Goeke et al. |
| 4,302,566 A | 11/1981 | Karol et al. |
| 4,543,399 A | 9/1985 | Jenkins, III et al. |
| 4,588,790 A | 5/1986 | Jenkins, III et al. |
| 4,719,193 A | 1/1988 | Levine et al. |
| 4,877,587 A | 10/1989 | Rhee et al. |
| 4,933,149 A | 6/1990 | Rhee et al. |
| 5,352,749 A | 10/1994 | DeChellis et al. |
| 5,405,922 A | 4/1995 | DeChellis et al. |
| 5,436,304 A | 7/1995 | Griffin et al. |
| 5,462,999 A | 10/1995 | Griffin et al. |
| 6,255,411 B1 | 7/2001 | Hartley et al. |
| 6,800,692 B2 | 10/2004 | Farley et al. |
| 6,825,293 B1 | 11/2004 | Goyal et al. |
| 6,828,395 B1 * | 12/2004 | Ehrman et al. ................ 526/114 |
| 7,211,535 B2 | 5/2007 | Kelly et a |

OTHER PUBLICATIONS

Peri et al, Surface structure of silica gel, J. Phys. Chem., Aug. 1968, pp. 2926-2933, vol. 70, No. 8.

Quirk et al, Ed, Transition Metal Catalyzed Polymerizations. 1988, pp. 396-416, Cambridge University Press.

* cited by examiner

*Primary Examiner* — William Cheung
(74) *Attorney, Agent, or Firm* — Kenneth H Johnson (57) ABSTRACT

The time between shut downs of a gas phase reactor for the polymerization of polyethylene may be significantly increased if the catalyst used is not prepared by impregnating the support with a solution of catalyst in an electron donor; the reaction is controlled using the addition of activator based on polymer production rate and the recycle stream contains a condensed liquid phase in an amount greater than 13 weight %. Operating the reactor in this manner increase the time between cleaning the cooler (heat exchanger) the bed plate, or both from about 4 to 6 months to not less than about 24 months.

12 Claims, 3 Drawing Sheets

FIGURE 1

Rx21 Cycle Gas Cooler

FIGURE 3

INCREASED RUN LENGTH IN GAS PHASE REACTORS

FIELD OF THE INVENTION

The present invention relates to gas phase polymerization of polyethylene, preferably fluidized bed gas phase polymerization. More particularly the present invention relates to a process to reduce fouling in the heat exchangers (coolers) of a gas phase reactor so that the reactors do not have to be shut down for cleaning any more frequently than 2 years (i.e. there is at least 24 months of continuous operation before a shutdown due to cooler contamination/plugging)

BACKGROUND OF THE INVENTION

The polymerization of ethylene homopolymers or copolymers is exothermic. One of the rate limiting factors in the industrial polymerization of polyethylene is the cooling rate for the reactors. In gas phase reactions the reactants, typically ethylene, one or more $C_{3-8}$ alpha olefins and other feeds enter the reactor beneath a distributor plate having many small pores or holes in it. The gas flow up through the distributor plate into a bed of particulate matter, generally polymer particles enclosed by a vertical, generally cylindrical reactor of substantially the same diameter as the distributor plate. The upward flow rate and pressure of the feed gas supports and fluidizes the bed. The gas flows through the bed reacting with particulate catalyst in the bed, typically within growing polymer particles. Above the bed (reaction zone) the reactor diameter increases resulting in a pressure drop of the gas and hence the velocity as it leaves the reaction zone. In theory this the polymer particles fall back into the reaction zone and the gas then cycles through a heat exchanger and back to the reactor together with required additional feed.

In practice "fines", very small particles of polymer, may be carried over from the reactor into the recycle loop passing through the cooler. The particles may contain active catalyst and tend to be deposited on the surfaces in the heat exchanger. Over time polymer builds up inside the heat exchanger and the pressure drop across the heat exchanger increases necessitating shutting down of the reactor and cleaning the heat exchanger.

Without wishing to be bound by theory there are also some theories of in-situ polymerization on the surface of the recycle line. This may also contribute to fouling or a combination of the fines and in-situ polymerization may cause fouling.

To increase the space time yield of the reactor (e.g. the cooling capacity) of the recycle stream, a condensable, non polymerizable hydrocarbon may be incorporated into the reactants. This hydrocarbon enters the reactor as a liquid phase and evaporates in the bed of polymer particles removing the heat of reaction. On passing through the heat exchanger the gas is condensed back to a liquid and then is returned to the reactor. This is generally referred to as condensing mode of operation or, depending on the amount of liquid, "super" condensing mode.

The first patents on condensing mode of operation are U.S. Pat. Nos. 4,543,399 issued Sep. 24, 1985 and 4,588,790 issued May 13, 1986 to Jenkins III et al., assigned to Union Carbide Corporation. The patents suggest that the liquid content in the recycle stream may be between about 2 and 20 weight % based on the weight of the stream. The 790 patent at column 7 lines 5 through 25 suggest that an excess of liquid in the recycle stream will help to prevent the build up of "mud" in sections of the recycle system where the flow rate is relatively low. The excess liquid may keep the system "washed clean".

There is comparable teaching at column 9 lines 18 to 30 about "washing the system out" in U.S. Pat. Nos. 4,877,587 and 4,933,149 issued Oct. 31, 1989 and Jun. 12, 1990 to Rhee et al., assigned to Union Carbide Chemicals and Plastics Company.

The next improvement in the condensed mode is the so called super condensed mode of Exxon. The liquid level in the recycle stream is increased above 20 weight % up to 50 weight %. This is technology illustrated by U.S. Pat. Nos. 5,352,749 issued Oct. 4, 1994 to DeChellis et al.; 5,405,922 issued Apr. 11, 1995 to DeChellis et al.; 5,436,304 issued Jul. 25, 1995 to Griffin et al.; and U.S. Pat. No. 5,462,999 issued Oct. 31, 1995 to Griffin et al., all assigned to Exxon Chemical Patents Inc. Interestingly the 749, 304 and 999 patents all refer to "mud" as being a potential problem even though the patents claim a higher concentration of liquids in the recycle stream.

U.S. Pat. No. 6,800,692 issued Oct. 5, 2004 to Farley et al., assigned to ExxonMobil Chemical Patents Inc. discusses the issue of fouling of the reactor from column 22 line 57 through Column 23 line 34. The patent describes methods to measure fouling rate but does not contain any specific teaching to reduce fouling. The minimum acceptable fouling rate appears to be about 12% per month which would result in a fouling of about 30% to 40% in about 3 to 4 months, well above the fouling rate of the present invention.

All of the above art suggest increasing liquid levels in the recycle stream may reduce fouling but no further specific instructions are given about how to achieve the desired results. At best the patents set a course of experimentation for one skilled in the art.

U.S. Pat. No. 6,825,293 issued Nov. 30, 2004 to Goyal et al., assigned to NOVA Chemicals International S.A. teaches a process for controlling the properties of polymers prepared in the presence of a Ziegler Natta catalyst by controlling the feed rate of activator to the reactor based on the production rate of polymer. The patents teach the process may be used in conjunction with the above noted patents of Jenkins III, DeChellis and Griffin. However, there is no teaching of any reduction in fouling in the reactor.

U.S. Pat. No. 7,211,535 issued May 1, 2007 to Kelly et al., assigned to NOVA Chemicals Corporation and Ineos Europe Limited teaches catalyst of the type used in the present invention. The patent also teaches the catalyst may be used in conjunction with the teachings of Goyal and Jenkin III, DeChellis and Griffin. There is nothing noted in the application about a reduction of fouling nor are any specific operating conditions suggested which would reduce fouling.

Applicants have unexpectedly found that by continuously operating a reactor having a level of condensed liquids in the recycle stream greater than 13 weight % based on the weight of the recycle stream and using the catalyst of Kelly et al. with the controlled addition of alumina according to Goyal et al the reactor may be operated for not less than 24 months without having to shut down to clean the cycle gas cooler (heat exchanger). Assuming Farley is correct and it is necessary to shut down at 40% fouling this gives a monthly fouling rate (i.e. 40/24) of less than 1.7%.

SUMMARY OF THE INVENTION

The present invention provides a method to reduce the rate of fouling of the heat exchangers in a gas phase reactor system at a temperature from 75° C. to 110° C. and a pressure less than 500 psi (3,447 kPa) in the presence of a gaseous monomer feed comprising from 80 to 100 weight % of ethylene and from 0 to 20 weight % of a $C_{4-6}$ alpha olefin so that the reactor system does not need to be brought down for cleaning more frequently than 24 months comprising:

i) continuously operating the reactor in condensed mode at condensable alkane levels not less than 13 weight % based on the weight of the recycle stream;

ii) using a catalyst having a productivity of greater than 1,500 grams of polymer per gram of catalyst (g/g) under standard commercial plant operations such as those to produce an ethylene hexene copolymer having an MI of 1 and a density of 0.918 prepared by contacting at a temperature from 0° C. to 100° C. a silica support having a particle size from 10 to 150 microns and a surface area greater than 250 $m^2/g$ which support has been heat treated to remove adsorbed water and having a residual surface hydroxyl content from 0.1 to 5 mmol/g of support, with:

(a) a first aluminum ($Al^1$) compound of the formula $R^1{}_bAl(OR^1)_aX_{3-(a+b)}$ wherein a is either 0 or 1, b is either 2 or 3 and the sum of a+b is up to 3, $R^1$ is independently selected from the group consisting of $C_{1-10}$ alkyl radicals and X is a chlorine atom, reactive with the surface hydroxyl groups to provide from 0.5 to 2.5 wt % Al on the support, in an inert hydrocarbyl solvent or diluent with or without isolation of the treated support from the hydrocarbyl solvent or diluents;

(b) a transition metal compound of the formula $Ti(OR^2)_cX_d$ wherein $R^2$ is independently selected from the group consisting of a $C_{1-4}$ alkyl radical and a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom;

(c) a magnesium halide, prepared by reacting in situ an alkyl magnesium compound of the formula $(R^5)_e MgX_{2-e}$ wherein each $R^5$ is independently a $C_{1-8}$ alkyl radical and e is 1 or 2 and X is a chlorine or bromine atom, with a reactive organic halide selected from the group consisting of $CCl_4$ and secondary and tertiary $C_{1-6}$ alkyl halides and mixtures thereof;

(d) a second aluminum alkyl compound of the formula $R^1{}_bAl(OR^1)_aX_{3-(a+b)}$ wherein a is either 0 or 1, b is either 2 or 3 and the sum of a+b is up to 3, $R^1$ is independently selected from the group consisting of $C_{1-10}$ alkyl radicals and X is a chlorine atom; and (e) an electron donor and separating the resulting catalyst from the inert hydrocarbyl solvent or diluent to provide a molar ratio of total Al ($Al^1+Al^2$) to Ti from 2:1 to 15:1; a molar ratio of Al from the second aluminum component ($Al^2$):Ti from 1:1 to 8:1, a molar ratio of Mg:Ti from 1:1 to 20:1; a molar ratio of active halide from the alkyl halide to Mg from 1:1 to 6:1; a molar ratio of electron donor to Ti from 0.5:1 to 18:1 and the titanium is present in the catalyst in an amount from 0.20 to 3.0 weight % inclusive of the support; and iii) controlling the feed of a co-catalyst of the formula $R^1{}_bAl(OR^1)_aX_{3-(a+b)}$ wherein a is either 0 or 1, b is either 2 or 3 and the sum of a+b is up to 3, $R^1$ is independently selected from the group consisting of $C_{1-10}$ alkyl radicals and X is a chlorine atom, to the reactor to provide from 10 to 50 ppm of aluminum from the co-catalyst based on the polymer production rate provided that the molar ratio of total Al from the catalyst and co-catalyst:Ti from the catalyst is from 25:1 to 80:1.

In a further embodiment the condensable alkane is selected from the group consisting of $C_{4-6}$ alkanes.

In a further embodiment the condensable alkane is present in an amount from 15 to 35 weight % based on the weight of the recycle stream.

In a further embodiment in the catalyst the order of addition of the components meets the following conditions:

(i) the transition metal compound cannot be added first;
(ii) when the Mg compound is added first, the transition metal compound cannot be added second;
(iii) when the second aluminum alkyl is added first, the transition metal compound cannot be added second;
(iv) when the Mg compound and the second aluminum alkyl compound are added first and second, in any order, the transition metal compound cannot be added third;
(v) the transitional metal compound must be added after the reactive organic halide;
(vi) the transition metal compound must be added after the alkyl magnesium compound;
(vii) the electron donor cannot be added last;
(viii) the reactive organic halide cannot be added last;
(ix) if the reactive organic halide is added first, the second aluminum alkyl compound cannot be added second;
(x) if the second aluminum alkyl compound is added first, the reactive organic halide cannot be added second; and
(xi) when the transition metal is added last, the second aluminum alkyl and Mg compounds cannot be added third or fourth, in any order.

In a further embodiment in the catalyst the aluminum compound are selected from the group consisting of trimethyl aluminum, triethyl aluminum, diethyl aluminum ethoxide, diisobutyl aluminum ethoxide, tri iso-butyl aluminum, triisoprenyl aluminum, tri-n-hexyl aluminum, tri-n-octyl aluminum, diethyl aluminum chloride and mixtures thereof.

In a further embodiment in the catalyst the magnesium compound is selected from the group consisting of dibutyl magnesium, butyl octyl magnesium and butyl ethyl magnesium, and the reactive alkyl halide is present in an amount to provide a molar ratio of active halogen:Mg from 1.5:1 to 3:1.

In a further embodiment in the catalyst the titanium component is selected from the group consisting of $TiCl_4$, $Ti(OC_4H_9)_4$, $Ti(OC_3H_7)_4$ and mixtures thereof and is present in an amount to provide from 0.20 to 3.0 weight % inclusive of the support.

In a further embodiment in the catalyst the electron donor is selected from the group consisting diethyl ether, triethyl amine, 1,4-dioxane, tetrahydrofuran, acetone, ethyl acetate, and cyclohexanone and mixtures thereof and is present in an amount to provide a molar ratio of electron donor:Ti from 2:1 to 12:1.

In a further embodiment the cocatalyst is selected from the group consisting of triethyl aluminum, tri-isobutyl aluminum and tri-n-hexyl aluminum.

In a further embodiment the cocatalyst is added to the reactor in an amount from 10 to 40 ppm of aluminum based on the production rate of the polymer.

In a further embodiment the comonomer is 1-butene.

In a further embodiment the reactor system does not need to be brought down for cleaning more frequently than 28 months.

The present invention contemplates combinations in whole or in part of the above embodiments together with any further teaching in this disclosure.

DETAILED DESCRIPTION

In this specification and claims the terms catalyst and catalyst precursor are used interchangeably as some may consider the catalyst the species activated with the co-catalyst. The term catalyst and catalyst precursor are meant to mean the supported composition before further reaction with the activator, typically a tri $C_{1-8}$, preferably $C_{2-6}$, most preferably $C_{2-4}$ alkyl aluminum or $C_{1-8}$, preferably $C_{2-6}$ most preferably $C_{2-4}$ alkyl aluminum halide in the reactor. In some embodiments of the invention the catalyst or catalyst precursor may be pre polymerized prior to introduction into the reactor. Typically the pre polymer contains from about 5 to 20, typically 5 to 15 weight % of supported catalyst.

As used in this specification the phrase co-catalyst parts per million ("ppm") based on the polymer production rate means the rate of co-catalyst injected (e.g. the mass flow rate of for example TEAL activator) into the reactor divided by the rate of production of resin or polymer coming out of the reactor. Al ppm refers to the injection rate of aluminum from the co-catalyst fed into the reactor divided by the production rate. As the polymerization of ethylene is an exothermic reaction in some instances the production rate of the resin may be determined from the heat balance for the reaction.

The present invention relates to the gas phase polymerization of ethylene with or without a comonomer. Gas phase polymerization includes both stirred bed reactors and fluidized bed reactors.

Fluidized bed gas phase reactors to make polyethylene are generally operated at temperatures from about 50° C. up to about 125° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi) most preferably from about 689.7 kPa (about 100 psi) to about 2,414 kPa (about 350 psi).

In the reactor the gas phase typically comprises the monomers, a balance gas such as nitrogen, possibly a molecular weight control agent such as hydrogen and in the process of the present invention a condensable alkane (i.e. condensing mode such as disclosed in U.S. Pat. No. 4,543,399 issued Sep. 24, 1985 to Jenkins III et al.; U.S. Pat. No. 4,588,790 issued May 15, 1986 to Jenkins III et al. and the so-called super condensing mode as disclosed in U.S. Pat. No. 5,352,749 issued Oct. 4, 1994 to DeChellis et al., assigned to Exxon Chemical Patents, Inc. and U.S. Pat. No. 5,436,304 issued Jul. 25, 1995 to Griffen et al., assigned to Exxon Chemical Patents, Inc.).

The process of the present invention is operated in "condensing mode". Accordingly, the process comprises recovering recycle feed stream from the reactor and optionally from the polymer recovery system (such as for example the polymer recovery system as described in U.S. Pat. No. 6,255,411 issued Jul. 3, 2001 to Hartley et al., assigned to Union Carbide Chemicals and Plastics Technology Corporation, the text of which is hereby incorporated by reference) and compressing the recycle stream and passing the resulting compressed recycle stream through a heat exchanger to condense that portion of the recycle stream condensable at temperatures (e.g. from 20° C. to 50° C.) and the pressures of the heat exchanger. The recycle stream is then fed to the gas phase polymerization reactor. The condensed phase then evaporates in the fluidized bed to reduce the heat within the bed.

The monomers comprise ethylene and optionally from 0 up to 20 generally about 0.5 to 16 preferably from 2 to 13, most preferably from 8 to 13 weight % (based on the monomers) of a copolymerizable $C_{3-5}$, preferably $C_{4-6}$, alpha olefin. Copolymerizable olefins include butene (1-butene), 4-methyl-1-pentene, hexene (1-hexene) and octene (1-octene), although it may be difficult to keep significant amounts of octene in the gas phase. The polymer may have a density from 0.905 to 0.960 g/cc.

The gas phase may also comprise a ballast gas such as nitrogen and a chain transfer agent such as hydrogen.

In accordance with the present invention the gas phase comprises not less than 13 weight % based on the recycle stream of one or more condensable alkanes. The gas phase may comprise from 13 to 45 weight % of condensable liquid, preferably from 13 to 40, most preferably from 15 to 35, desirably from 17 to 30 weight % of one or more condensable liquids. Some condensable alkanes include $C_{4-6}$ alkanes (e.g. butane, pentane, iso-pentane, hexane, cyclohexane, etc.)

In a further embodiment of the present invention when there is an ethane cracker close to the polymerization reactor the gas phase feed to the reactor may comprise "dilute" ethylene (e.g. raw ethylene from a cracker from which the ethane component has not been separated). In such a case preferably the feed stream may comprise from 35 to 45 weight % of ethylene, from 0 to about 40 weight % of ethane, from 10 to 20 weight % of a copolymerizable alpha olefin selected from the group consisting of butene and hexene, preferably butane, from 15 to 35 weight % of one or more $C_{3-5}$ condensable alkanes at temperatures from 20° C. to 50° C. at the pressures of the heat exchanger for the recycle stream and from 0 to 1 weight % of hydrogen.

In such a process the ethane may be recovered from the recycle stream, preferably after it is compressed. The ethane may be recovered using a number of technologies such as a $C_2$ splitter (a distillation tower capable of separating ethane from ethylene) a pressure swing adsorption unit, or a membrane separation unit. At least a part and preferably all of the separated and/or recovered ethylene and/or hydrogen from the recycle stream is fed back to the gas phase polymerization reactor. Preferably at least a part, most preferably not less than 85%, desirably not less than 95 weight % of the ethane recovered from the feed stream is recycled to an ethylene cracker.

Ziegler-Natta catalysts may be used in the gas phase polymerization of ethylene. Typically the catalysts comprise a support, a magnesium compound (optionally in the presence of a halide donor to precipitate magnesium halide), a titanium compound and an aluminum compound, optionally in the presence of an electron donor. The aluminum compound may be added at several stages. It may be on the support, it may be reacted, typically in suspension or solution with the titanium compound or it may be added to a catalyst or catalyst precursor in the reactor. The amount of aluminum from the co-catalyst, typically triethyl aluminum, added to the reactor is controlled as described below.

The support for the catalyst typically comprises an inorganic substrate usually of alumina or silica having a pendant reactive moiety. The reactive moiety may be a siloxy radical or more typically is a hydroxyl radical. The preferred support is silica. The support should have an average particle size from about 10 to 150 microns, preferably from about 20 to 100 microns. The support should have a large surface area typically greater than about 100 m$^2$/g, preferably greater than about 250 m$^2$/g, most preferably from 300 m$^2$/g to 1,000 m$^2$/g. The support will be porous and will have a pore volume from about 0.3 to 5.0 ml/g, typically from 0.5 to 3.0 ml/g. Supports which are specifically designed to be an agglomeration of sub-particles while useful, are not required.

It is important that the support be dried prior to the initial reaction with an aluminum compound. Generally the support may be heated at a temperature of at least 200° C. for up to 24 hours, typically at a temperature from 500° C. to 800° C. for about 2 to 20 hours. The resulting support will be free of adsorbed water and should have a surface hydroxyl content from about 0.1 to 5 mmol/g of support, preferably from 0.5 to 3 mmol/g.

A silica suitable for use in the present invention has a high surface area is amorphous silica (surface area of 300 m$^2$/gm; pore volume of 1.65 cm$^3$ per gram). For example, commercially available silicas are marketed under the trademark of Davison® 958 and Davison® 955 by the Davison Chemical Division of W. R. Grace and Company.

The amount of the hydroxyl groups in silica may be determined according to the method disclosed by J. B. Peri and A. L. Hensley, Jr., in J. Phys. Chem., 72 (8), 2926 (1968), the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound (e.g. triethyl aluminum) or a silane compound. This method of treatment has been disclosed in the literature and two relevant examples are: U.S. Pat. No. 4,719,193 to Levine in 1988 and by Noshay A. and Karol F. J. in Transition Metal Catalyzed Polymerizations, Ed. R. Quirk, 396, 1989. For example the support may be treated with an aluminum compound of the formula $Al((O)_a R^1{}_b X_{3-b})$, wherein a is either 0 or 1, b is an integer from 1 to 3, $R_1$ is a $C_{1-8}$ alkyl radical and X is a chlorine atom. The aluminum content on the support is included in the ratio of Al:Ti in the catalyst. The amount of aluminum compound is such that the amount of aluminum on the support will be from about 0.5 to 2.5 weight % based on the weight of the support.

There are a number of strategies to combine the components of the catalyst system. For example a number of patents assigned to Union Carbide Corporation, represented by U.S. Pat. No. 4,302,566 to Karol et al. and U.S. Pat. No. 4,302,565 to Goeke et al. both issued Nov. 24, 1981, teach forming a catalyst or catalyst precursor composition from the titanium compound, the magnesium compound and the electron donor compound and then impregnating the support with the precursor composition and then contacting the impregnated support, typically in the reactor, with the co-catalyst compound in one or more steps.

Some Ziegler-Natta catalyst useful in accordance with the present invention will comprise an aluminum compound of the formula $R^1{}_b Al(OR^1)_a X_{3-(a+b)}$ wherein a is an integer from 0 to 3, typically 0 or 1, b is an integer from 0 to 3 and the sum of a+b is from 0 to 3, each $R^1$ is independently selected from the group consisting of (the same or different) $C_{1-10}$ alkyl radical and X is a chlorine atom; a titanium compound of the formula $Ti(OR^2)_c X_d$ wherein each $R^2$ is independently selected from the group consisting of a $C_{1-4}$ alkyl radical, a $C_{8-10}$ aromatic radical, X is selected from the group consisting of a chlorine atom and a bromine atom, c is 0 or an integer up to 4 and d is 0 or an integer up to 4 and the sum of c+d is the valence of the Ti atom; a magnesium compound of the formula $(R^5)_e MgX_{2-e}$ wherein each $R^5$ is independently selected from the group consisting of $C_{1-8}$ alkyl radical and e is 1 or 2; a reactive organic halide selected from the group consisting of $CCl_4$ and $C_{1-6}$ alkyl halides preferably $C_{3-6}$ secondary and tertiary alkyl halides, preferably chlorides or a mixture thereof and optionally an electron donor, to provide a molar ratio of total Al to Ti (e.g. the first and second aluminum additions $Al^1$ and $Al^2$ typically from 0 to 70 weight % of the aluminum compound is used to treat the support and the remaining aluminum is added at some time during the rest of the catalyst synthesis) from 2:1 to 15:1; a molar ratio of Al from the second aluminum ($Al^2$) addition to Ti from 1:1 to 8:1; a molar ratio of Mg:Ti from 1:1 to 20:1, preferably 2:1 to 12:1; a molar ratio of active halide (this excludes the halide from the Al and Ti compounds If present) from the $CCl_4$ or $C_{1-6}$ preferably $C_{3-6}$ alkyl halide or mixtures thereof to Mg from 1:1 to 6:1, preferably 1.5:1 to 5:1; and a molar ratio of electron donor to Ti from 0:1 to 18:1, preferably from 0.5:1 to 15:1. Generally, the titanium is present in the catalyst in an amount from 0.20 to 3.0 weight % inclusive of the support.

Typically the catalyst components are reacted in an organic medium such as an inert $C_{5-10}$ hydrocarbon that may be unsubstituted or is substituted by a $C_{1-4}$ alkyl radical. Some solvents include pentane, isopentane, hexane, isohexane, heptane, octane, cyclohexane, methyl cyclohexane, hydrogenated naphtha and ISOPAR®E (a solvent available from Exxon Chemical Company) and mixtures thereof.

Typically the aluminum compounds useful in the formation of the catalyst or catalyst precursor in accordance with the present invention have the formula $R^1{}_b Al(OR^1)_a X_{3-(a+b)}$ wherein a is an integer from 0 to 3, preferably 0 or 1, b is an integer from 0 to 3 preferably 2 or 3 most preferably 3, and the sum of a+b is from 0 to 3 preferably 3, each $R_1$ is independently selected from the group consisting of (the same or different) $C_{1-10}$, preferably $C_{1-8}$ alkyl radicals and X is a halogen atom preferably a chlorine atom. Suitable aluminum compounds include, trimethyl aluminum (TMA), triethyl aluminum (TEAL), diethyl aluminum ethoxide, diisobutyl aluminum ethoxide, isoprenyl aluminum, tri-isobutyl aluminum (TiBAL), diethyl aluminum chloride (DEAC), tri-n-hexyl aluminum (TnHAl), tri-n-octyl aluminum (TnOAl), and mixtures thereof. The aluminum compounds containing a halide may be an aluminum sesqui-halide. Preferably, in the aluminum compound, a is 0, b is 3 and $R_1$ is a $C_{1-8}$ alkyl radical.

The magnesium compound may be a compound of the formula $(R^5)MgX_{2-e}$ wherein each $R^5$ is independently selected from the group consisting of $C_{1-8}$ alkyl radicals and e is 1 or 2. Some commercially available magnesium compounds include magnesium chloride, butyl octyl magnesium, dibutyl magnesium and butyl ethyl magnesium. If the magnesium compound is soluble in the organic solvent it may be used in conjunction with a $C_{3-6}$ halogenating agent or reactive organic halide to form magnesium halide (i.e. $MgX_2$ where X is a halogen preferably chlorine or bromine, most preferably chlorine), which precipitates from the solution (potentially forming a substrate for the Ti compound).

Some halogenating agents (e.g. reactive organic halides) include $CCl_4$ or one or more alkyl halides, preferably chlorides, of the formula $R^6Cl$ wherein $R^6$ is selected from the group consisting of $C_{1-6}$ alkyl radicals preferably secondary and tertiary $C_{3-6}$ alkyl radicals. Suitable chlorides include sec-butyl chloride, t-butyl chloride and sec-propyl chloride. The reactive halide is added to the catalyst in a quantity such that the molar ratio of active halide (e.g. chloride from the reactive organic halide):Mg should be from 1:1 to 6:1, preferably from 1.5:1 to 5:1, more preferably from 1.5:1 to 3:1 and most preferred from 1.9:1 to 3:1.

The titanium compound in the catalyst has the formula $Ti(OR^2)_cX_d$ wherein each $R^2$ is independently selected from the group consisting of a $C_{1-4}$ alkyl radical, and a $C_{6-10}$ aromatic radical, X is selected from the group consisting of a chlorine atom and a bromine atom preferably chlorine, c is 0 or an integer up to 4 and d is 0 or an integer up to 4 and the sum of c+d is the valence of the Ti atom. The titanium compound may be selected from the group consisting of $TiCl_3$, $TiCl_4$, $Ti(OC_4H_9)_4$, $Ti(OC_3H_7)_4$, and $Ti(OC_4H_9)Cl_3$. Most preferably the titanium compound is selected from the group consisting of $Ti(OC_4H_9)_4$, $Ti(OC_3H_7)_4$, and $TiCl_4$ and mixtures thereof. Generally, the titanium in the catalyst or catalyst precursor is present in an amount from 0.20 to 3, preferably from 0.20 to 1.5, most preferably from 0.25 to 1.0 weight % based on the final weight of the catalyst (including the support).

As noted above, an electron donor may be and in fact is preferably used in the catalysts or catalysts precursor used in accordance with the present invention. The electron donor may be selected from the group consisting of $C_{3-18}$ linear or cyclic aliphatic or aromatic ethers, ketones, esters, aldehydes, amides, nitrites, amines, phosphines or, siloxanes. Preferably, the electron donor is selected from the group consisting of diethyl ether, triethyl amine, 1,4-dioxane, tetrahydrofuran, acetone, ethyl acetate, and cyclohexanone and mixtures thereof. The electron donor when present may be used in a molar ratio to the titanium from 0.5:1 to 18:1 preferably in a molar ratio to Ti from 1:1 to 15:1, most preferably from 2:1 to 12:1.

In the catalyst or catalyst precursor the molar ratio of Mg:Ti may be from 1:1 to 20:1, preferably from 2:1 to 12:1, most preferably from 3:1 to 10:1. The molar ratio of second aluminum ($A^2$) to titanium in the catalyst may be from 1:1 to 8:1, preferably from 1.5:1 to 7:1, most preferably from 2:1 to 6:1. Generally, from 0 to not more than about 70 weight %, preferably from 10 to 60 weight %, of the aluminum (compound in the catalyst) may be used to treat the support (e.g. $Al^1$). The molar ratio of active halide (from the reactive organic halide) to Mg may be from preferably 1.5:1 to 5:1, more preferably from 1.5:1 to 3:1, most preferably from 1.9:1 to 3:1. The molar ratio of electron donor, if present, to Ti may be from 0.5:1 to 18:1, preferably from 1:1 to 15:1, most preferably from 2:1 to 12:1. The molar ratio of total Al (i.e. $Al^1+Al^2$):Mg in the catalyst or catalyst precursor may be from 0.35:1 to 3:1, preferably from 0.4:1 to 2:1.

In one embodiment of the invention the catalyst preparation process conducted in a hydrocarbon solvent at a temperature from 0° C. to 100° C. in which the order of chemical addition is important. A preferred sequence of addition of the components is as follows:

a) contacting a dehydrated silica support containing from 0.5 to 2.5 weight % aluminum having the formula $R^1_bAl(OR^1)_aX$ wherein a is an integer from 0 to 3 preferably 0 or 1, b is an integer from 0 to 3, preferably 2 or 3, most preferably 3, and the sum of a+b is from 0 to 3, preferably 3, each $R^1$ is independently selected from the group consisting of $C_{1-10}$ alkyl radicals, X is selected from the group consisting of Cl and Br preferably Cl; with (b) a magnesium compound of the formula $Mg(R^5)_2$ wherein each $R^5$ is independently selected from the group consisting of $C_{1-8}$ alkyl radicals and may contain an aluminum alkyl as a thinning agent, to provide from 0.25 to 8.0 weight % of Mg based on the weight of the silica; contacting the resulting product with (c) a reactive organic halide selected from the group consisting of $CCl_4$ and $C_{3-6}$ secondary and tertiary alkyl chlorides or a mixture thereof to provide a Cl:Mg molar ratio from 1.5:1 to 3:1 in the resulting product; and contacting the resulting product with (d) an aluminum compound of the formula $R^1_bAl(OR^1)_aX_{3-(a+b)}$ wherein a is an integer from 0 to 3, preferably 0 or 1, b is an integer from 0 to 3, preferably 2 or 3, most preferably 3, and the sum of a+b is from 0 to 3, preferably 3, $R^1$ is the same or different $C_{1-10}$ alkyl radical, X is selected from the group consisting of a chlorine or bromine atom, preferably chlorine, to provide a molar ratio of Al (from the second aluminum addition (e.g. $Al^2$):Ti from 1:1 to 8:1;

(e) optionally an electron donor (ED) in an ED:Ti ratio from 0:1 to 18:1. The electron donor may be selected from the group consisting of $C_{3-18}$ linear or cyclic aliphatic or aromatic ethers, ketones, ester, aldehydes, amides, esters, nitriles, amines, phosphines, or siloxanes. Preferably, the electron donor is selected from the group consisting of diethyl ether, triethyl amine, 1,4-dioxane, tetrahydrofuran, acetone, ethyl acetate, and cyclohexanone and mixtures thereof. The electron donor may be used in a molar ratio to the titanium from 0:1 to 18:1, preferably from 0.5:1 to 15:1, more preferably from 1:1 to 15:1 and most preferably from 2:1 to 12:1;

(f) a titanium compound of the formula $Ti(OR^2)_cX_d$ wherein each $R^2$ is independently selected from the group consisting of $C_{1-4}$ alkyl radicals and $C_{6-10}$ aromatic radicals, X is selected from the group consisting of a chlorine atom and a bromine atom, preferably a chlorine atom, c is 0 or an integer up to 4 and d is 0 or an integer up to 4 and the sum of c+d is the valence of the Ti atom, preferably 3 or 4, to provide from 0.20 to 3 weight % of Ti based on the final catalyst.

The order of carrying out b through f is dependent on the criteria listed above being met. There are 120 different ways in which to produce a catalyst using the above five compounds (e.g. for any given 5 components assuming the treated silica is always added first, they may be mixed in 120 different ways). However, by employing the above restrictions, only 24 are allowed. Without being tied to any theories, even limiting the catalyst synthesis to the above criteria will likely produce a number of catalysts that show low productivity and hence have limited commercial applicability. Thus, productivity is a limitation to limit the number of catalyst formulations that proves to be useful. The productivity criteria is that the catalyst has a productivity of greater than 1,500 grams of polymer per gram of catalyst (g/g) under standard commercial plant operations such as for an ethylene hexene copolymer having an MI of 1 and a density of 0.918. The conditions of operation of a plant to produce a resin having a melt index (MI) of 1 as determined by ASTM D 1238-04 and a density of 0.918 g/cc as determined by ASTM D 792-00 are well known to those skilled in the art. However, if the productivity of a catalyst is below 1,500 g of polymer/g of catalyst due to the poor selection of components and or loading levels this does not mean that a particular synthesis order is poor. It may simply mean that another formulation is required to obtain a usable catalyst when using a particular order of addition. For example, if the halide (preferably Cl):Mg molar ratio is 1.5 in the above synthesis some of the possible 24 combinations may produce a catalyst with low productivity. However, if the halide (preferably Cl):Mg molar ratio is 3, then it is highly likely that all of the above 24 combinations would produce an active catalyst. Following the above criterion, one of ordinary skill in the art, may, by routine non-inventive experimentation, determine appropriate components, loadings and sequence following the teachings of the present invention.

One needs to consider that the ideal catalyst of choice may be selected by the user to provide the best product for the lowest cost. However, in general there are three distinct user groups: polyethylene manufacturers, polyethylene converters and polyethylene consumers, and their criteria for success may not always be aligned. For example it is likely that everyone wants the best product for the least cost. However, the polymer manufacturer may want to maximize plant throughput by increasing the flowability of the granular resin through the plant or by increasing the MWD to increase throughput through an extruder. Polymer manufacturers may also choose to increase bulk density to increase the speed at which product can be discharged from the reactor. Alternately, polymer manufacturers may want to reduce the need for a costly co-catalyst such as trimethyl aluminum and instead use triethyl aluminum. To limit capital costs, losses to flare or reduce the amount of co-monomer being recycled, polymer manufacturers may also want a catalyst that requires low levels of co-monomer to ethylene in the reactor. Then again, polymer manufacturers may want a catalyst with high productivity to reduce the amount they spend on catalyst. Converters will want to maximize throughput in their extruders and want broad MWD products without the loss of polymer physical properties. Hexane extractables may be important to a converter such that the products they make pass specific FDA regulations. Consumers on the other hand will want tough products in applications such as garbage bags and therefore may require high dart impact strength and machine direction (MD) tear strength. On the other hand, converters and consumers may prefer sticky resin for stretch wrapping products. In summary, the ideal catalyst is dependent on the end user group and thus there can be many preferred catalysts. From a polymer manufacturers perspective it would be best to have one catalyst fit all. However, from a users perspective one generally prefers to have specific applications areas addressed. For any given product, while one manufacturer wants a high productivity catalyst, another may want a catalyst that delivers a product with low hexane extractables, or high bulk density while a third may want a low $C_6/C_2$ gas phase ratio. These requests can now be fulfilled.

One general synthetic procedure which follows the above criteria could be written as follows: treated silica is added to a reaction vessel and treated concurrently with the following, with or without isolation, butyl ethyl magnesium, t-butyl chloride, tetrahydrofuran, titanium tetrachloride, and trioctyl aluminum prior to drying to produce a free flowing powder. This is one of the acceptable orders as defined above. The catalyst or catalyst precursor is fed to the reactor, generally above a distributor plate into the bed of growing polymer particles using a metering device. One such device is referenced at Col. 8 lines 15 20 of U.S. Pat. No. 4,543,399 issued Sep. 24, 1985 to Jenkins III et al. assigned to Union Carbide Corporation (which references U.S. Pat. No. 3,779,712 issued Dec. 18, 1973 to Calvert et al., assigned to Union Carbide Corporation). The co-catalyst, typically a tri $C_{1-8}$ alkyl aluminum (in neat form or in a solution diluted with a hydrocarbon solvent) is also fed to the bed of growing polymer particles using a liquid metering device. Such devices are known in the art.

In accordance with the present invention generally, one or more co-catalyst(s) is injected into the cycle gas immediately upstream of the reactor and enters the reactor, below the bed plate in an amount such that the molar ratio of total Al from the catalyst and co-catalyst:Ti from the catalyst is not less than 25:1. The co-catalyst may be fed to the reactor to provide from 10 to 50, preferably 10 to 40, more preferably from 17 to 30, most preferably from 20 to 26 ppm of aluminum (Al ppm) based on the polymer production rate. Typically the molar ratio of total Al (i.e. aluminum from the catalyst and co-catalyst):Ti (from the catalyst) is between 25:1 and 80:1.

The co-catalyst may be selected from the group consisting of tri $C_{2-6}$ alkyl aluminums, alkyl aluminum chlorides, and mixtures thereof. This includes triethyl aluminum, tri propyl aluminum, tributyl aluminum, tri isobutyl aluminum, tri n-hexyl aluminum, diethyl aluminum chloride, dibutyl aluminum chloride, and mixtures thereof. Preferably the co-catalyst is selected from the group consisting of triethyl aluminum tri-isobutyl aluminum, and tri-n-hexyl aluminum and mixtures thereof. While the aluminum halides might be useful in accordance with the present invention they increase the amount of halide in the polymer resulting in increased consumption of additives to neutralize and stabilize the resulting polymer.

A useful polymer prepared in accordance with the present invention may be a copolymer containing butane as the co-monomer. Triethyl aluminum may be used as a co-catalyst in amounts generally from 50 to 200 ppm of TEAL, typically 50 to 150 ppm of TEAL (12 to 35 ppm Al) preferably 70 to 130 ppm of TEAL (16 to 31 ppm Al), most preferably from 85 to 110 ppm of TEAL (20 to 26 ppm Al) based on the polymer production rate.

In some instances, by using the Al ppm control technique to reduce resin stickiness, it is possible to increase the throughput of the reactor. Increases of up to about 20% have been observed. The variability in the properties of the resin and process control parameters including melt index, density, hexane extractables, hydrogen and comonomer response, may be reduced by up to about 50% by using the Al ppm control method.

The resulting polymers may be used in a number of applications such as film extrusion, both cast and blown film extrusion and both injection and rotomolding applications. Typically the polymer may be compounded with the usual additives including heat and light stabilizers such as hindered phenols; ultra violet light stabilizers such as hindered amine stabilizers (HALS); process aids such as fatty acids or their derivatives and fluoropolymers optionally in conjunction with low molecular weight esters of polyethylene glycol.

The present invention will now be illustrated by the following non-limiting examples.

Prior to the earliest date in the attached figures NOVA Chemicals had begun using the Al ppm process to control its low density gas phase polyethylene reactors. The figures show that the Al ppm control process on its own does not significantly change the frequency of cleaning of the cooler (heat exchanger) or the bed plate or both.

Figure 1:
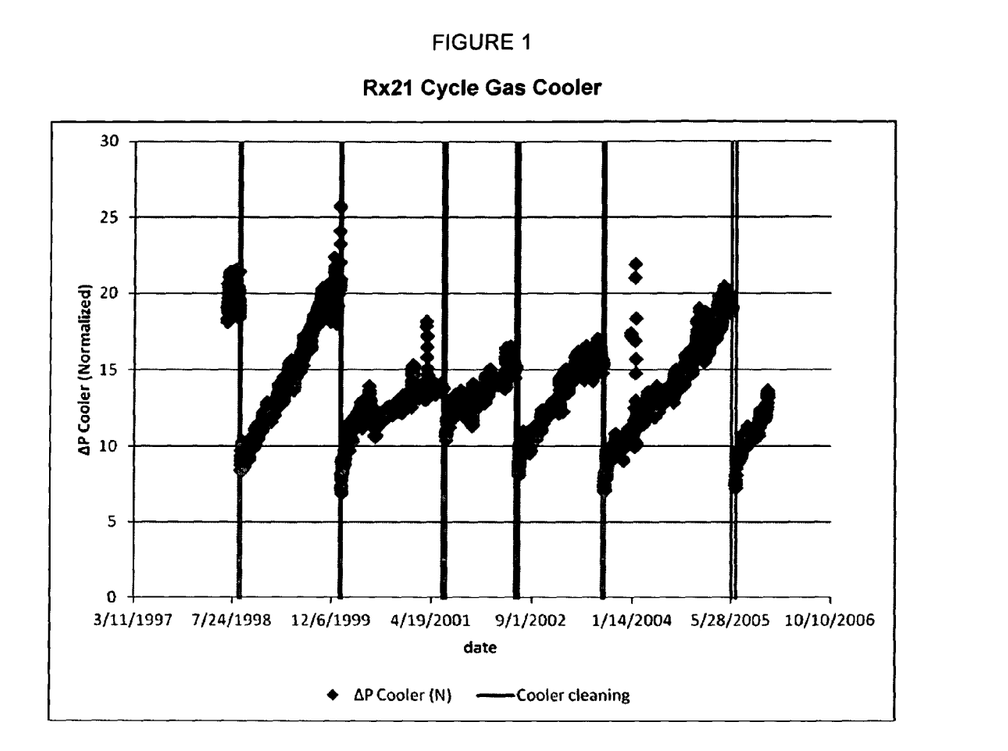
FIG. 1 is a graph of the normalized pressure drop in psi across the cycle gas cooler (heat exchanger) at NOVA Chemicals' linear low density gas phase polyethylene plant for the period from June of 1998 through November 2005.

FIG. 1 is a graph of the pressure drop across the cooler (heat exchanger) at the reactor dedicated to make linear low density ethylene butene copolymers from June of 1998 through November of 2005. During this period of time the catalyst used was a catalyst prepared in the presence of an electron donor and the resulting solution was impregnated into the support. Also during this period of time the plant routinely switched from dry mode to condensed mode. In the graph the pressure drop increases until the reactor is shut down to clean the heat exchanger. The "mud" did not wash out of the down stream train and particularly in the heat exchanger. The double vertical lines in the graph are shutdowns to clean the cooler (heat exchanger). The graph shows it was necessary to shut down the reactor on a periodic basis to clean the cooler (heat exchanger) about every 4 to 6 months.

Figure 2:
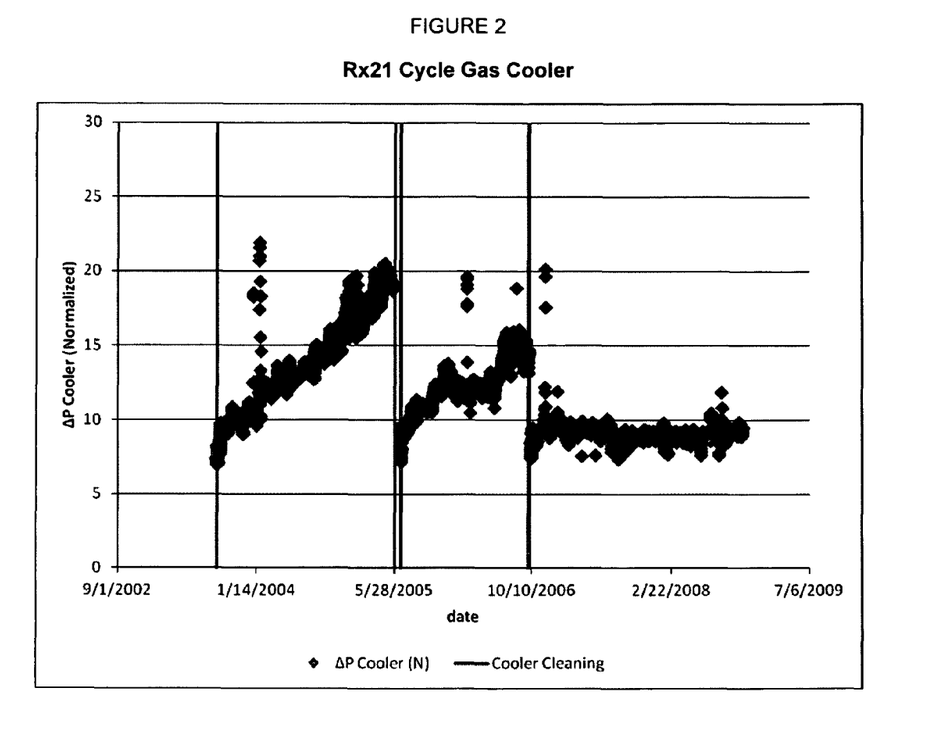
FIG. 2 is a graph of the normalized pressure drop in psi across the cycle gas cooler (heat exchanger) at NOVA Chemicals' linear low density gas phase polyethylene plant for the period from August 2003 through October 2008.

FIG. 2 is a graph of the pressure drop across the cooler (heat exchanger) for the same reactor for the period of time from August 2003 through October of 2008. This graph shows a shut down to clean the heat exchanger about May of 2005. The last use of a catalyst prepared in a solution of electron donor was in the period November/December 2005. Thereafter the catalyst was prepared in accordance with the present invention. About the same period of time the capacity to handle liquids in the recycle stream was increase to be able to maintain a liquid phase above 13 weight % based on the weight of the recycle stream. The last dry mode run at the plant was in July 2006. The plant was shut down in September 06 consistent with the shutdown rate for the catalyst system used in FIG. 1. The September 06 shutdown was to clean both the cooler (heat exchanger) and the bed plate. This shows that using the catalyst system of the present invention and switching from dry to condensed mode still results in periodic shutdowns on a 4 to 6 month basis. After September 2006, the plant was run continuously in condensed mode above 13 weight % (but below 20 weight % liquids) using the catalyst of the present invention in conjunction with the Al:ppm mode of operation. The plant ran without shut down due to pressure drop across the heat exchanger beyond October 2008, well beyond the 4 to 6 month expectations from previous operating data.

Figure 3:
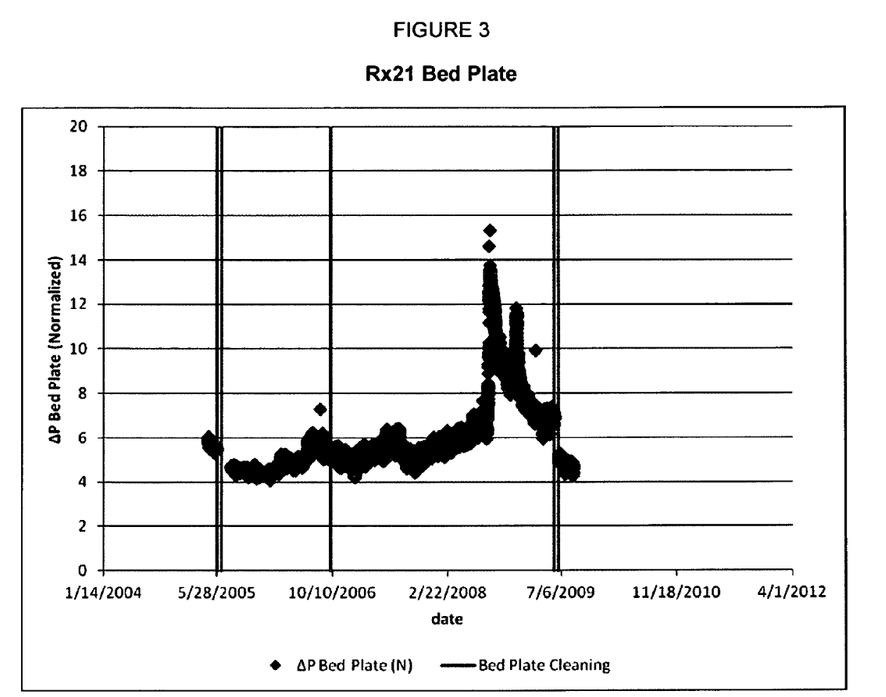
FIG. 3 is a graph of the normalized pressure drop across the bed plate (disperser plate) at NOVA Chemicals' linear low density gas phase polyethylene plant for the period from April 2005 through March-April 2009 (the graph extends beyond this point but there is no data in the graph).

FIG. 3 shows the pressure drop across the bed plate in NOVA Chemicals linear low density polyethylene plant for the period from April 2005 through March of 09 (note the graph extends to September 2010). The parallel vertical lines at the left (May 5) are the cleaning of the cooler (heat exchanger) (see FIG. 2). The single line at September 06 is a shutdown to clean both the cooler (heat exchanger) and the bed plate. As noted above after December of 05 the catalyst was changed to that of the present invention. After September 06 the plant was run in continuous condensed mode with a liquids level in the recycle stream from 13 to 20 wt %. The two peaks at the right with the pressure drop off on the right side of the peak show the bed plate is self cleaning under the conditions of the present invention. It should be noted that at the highest peak on the right (August 08) the superficial gas velocity was increased to about 0.79 m/s.

At the peaks of July 07 and August 08 there was a type 2 kill of the catalyst (e.g. a catalyst poison is injected below the bed plate and a top vent in the reactor is opened to draw the poison through the bed.)

At the peak of December 08 there was a type 1 kill (e.g. a circulating kill—a catalyst poison is introduced into the reactor and circulated through the bed in a normal manner)

After the above "kills" the reaction was restarted without having to clean the reactor.

What is claimed is:

1. A method to reduce the rate of fouling of the heat exchangers in a gas phase reactor system at a temperature from 75° C. to 110° C. and a pressure less than 500 psi (3,447 kPa) in the presence of a gaseous feed consisting of a monomer feed consisting of from 80 to 100 weight % of ethylene and from 0 to 20 weight % of a $C_{4-6}$ alpha olefin; nitrogen; and hydrogen so that the reactor system does not need to be brought down for cleaning more frequently than 24 months consisting of:

i) continuously operating the reactor in condensed mode at condensable alkane levels not less than 13 weight % based on the weight of the recycle stream;

ii) using a Zielgler Natta catalyst having a productivity of greater than 1,500 grams of polymer per gram of catalyst (g/g) under standard commercial plant operations to produce an ethylene hexene copolymer having an MI of 1 and a density of 0.918 said catalyst prepared by contacting at a temperature from 0° C. to 100° C. a silica support having a particle size from 10 to 150 microns and a surface area greater than 250 m²/g which support has been heat treated to remove adsorbed water and having a residual surface hydroxyl content from 0.1 to 5 mmol/g of support, with:

(a) a first aluminum (Al') compound of the formula $R^1{}_b Al(OR^1)_a X_{3-(a+b)}$ wherein a is either 0 or 1, b is either 2 or 3 and the sum of a+b is up to 3, each $R^1$ is independently selected from the group consisting of $C_{1-10}$ alkyl radicals and, X is a chlorine atom, reactive with the surface hydroxyl groups to provide from 0.5 to 2.5 wt % Al on the support, in an inert hydrocarbyl solvent or diluent with or without isolation of the treated support from the hydrocarbyl solvent or diluents;

(b) a transition metal compound of the formula $Ti(OR^2)_c X_d$ wherein each $R^2$ is independently selected from the group consisting of $C_{1-4}$ alkyl radicals and $C_{6-10}$ aromatic radicals, X is selected from the group consisting of a chlorine atom and a bromine atom, c is 0 or an integer up to 4 and d is 0 or an integer up to 4 and the sum of c+d is the valence of the Ti atom;

(c) a magnesium halide, prepared by reacting in situ an alkyl magnesium compound of the formula $(R^5)_e Mg X_{2-e}$ wherein each $R^5$ is independently selected from the group consisting of $C_{1-8}$ alkyl radicals and e is 1 or 2 and X is a chlorine or bromine atom, with a reactive organic halide selected from the group consisting of $CCl_4$ and secondary and tertiary $C_{1-6}$ alkyl halides and mixtures thereof;

(d) a second aluminum alkyl compound of the formula $R^1{}_b Al(OR^1)_a X_{3-(a+b)}$ wherein a is either 0 or 1, b is either 2 or 3 and the sum of a+b is up to 3, each $R^1$ is independently selected from the group consisting of $C_{1-10}$ alkyl radicals and X is a chlorine atom; and (e) an electron donor and separating the resulting catalyst from the inert hydrocarbyl solvent or diluent to provide a molar ratio of total Al ($Al^1+Al^2$) to Ti from 2:1 to 15:1; a molar ratio of Al from the second aluminum component ($Al^2$): Ti from 1:1 to 8:1, a molar ratio of Mg:Ti from 1:1 to 20:1; a molar ratio of active halide from the alkyl halide to Mg from 1:1 to 6:1; a molar ratio of electron donor to Ti from 0.5:1 to 18:1 and the titanium is present in the catalyst in an amount from 0.20 to 3.0 weight % inclusive of the support; and iii) controlling the feed of a co-catalyst of the formula the formula $R^1{}_b Al(OR^1)_a X_{3-(a+b)}$ wherein a is either 0 or 1, b is either 2 or 3 and the sum of a+b is up to 3, each $R^1$ is independently selected from the group consisting of $C_{1-10}$ alkyl radicals and, X is a chlorine atom, to the reactor to provide from 10 to 50 ppm of aluminum from the co-catalyst based on the polymer production rate provided that the molar ratio of total Al from the catalyst and co-catalyst:Ti from the catalyst is from 25:1 to 80:1.

2. The process according to claim 1, wherein the condensable alkane is selected from the group consisting of $C_{4-6}$ alkanes.

3. The process according to claim 2, wherein the condensable alkane is present in an amount from 15 to 35 weight % based on the weight of the recycle stream.

4. The process according to claim 3, wherein in the catalyst the order of addition of the components meets the following conditions:

(i) the transition metal compound cannot be added first;
(ii) when the Mg compound is added first, the transition metal compound cannot be added second;

(iii) when the second aluminum alkyl is added first, the transition metal compound cannot be added second;

(iv) when the Mg compound and the second aluminum alkyl compound are added first and second, in any order, the transition metal compound cannot be added third;

(v) the transitional metal compound must be added after the reactive organic halide;

(vi) the transition metal compound must be added after the alkyl magnesium compound;

(vii) the electron donor cannot be added last;

(viii) the reactive organic halide cannot be added last;

(ix) if the reactive organic halide is added first, the second aluminum alkyl compound cannot be added second;

(x) if the second aluminum alkyl compound is added first, the reactive organic halide cannot be added second; and (xi) when the transition metal is added last, the second aluminum alkyl and Mg compounds cannot be added third or fourth, in any order.

5. The process according to claim 4, wherein in the catalyst the aluminum compound are selected from the group consisting of trimethyl aluminum, triethyl aluminum, diethyl aluminum ethoxide, diisobutyl aluminum ethoxide, tri iso-butyl aluminum, triisoprenyl aluminum, tri-n-hexyl aluminum, tri-n-octyl aluminum, diethyl aluminum chloride and mixtures thereof.

6. The process according to claim 5, wherein in the catalyst the magnesium compound is selected from the group consisting of dibutyl magnesium, butyl octyl magnesium and butyl ethyl magnesium and the reactive alkyl halide is present in an amount to provide a molar ratio of active halogen:Mg from 1.5:1 to 3:1.

7. The process according to claim 6, wherein in the catalyst the titanium component is selected from the group consisting of $TiCl_4$, $Ti(OC_4H_9)_4$, $Ti(OC_3H_7)_4$ and mixtures thereof and is present in an amount to provide from 0.20 to 3.0 weight % inclusive of the support.

8. The process according to claim 7, wherein in the catalyst the electron donor is selected from the group consisting diethyl ether, triethyl amine, 1,4-dioxane, tetrahydrofuran, acetone, ethyl acetate and cyclohexanone and mixtures thereof and is present in an amount to provide a molar ratio of electron donor:Ti from 2:1 to 12:1.

9. The process according to claim 8, wherein the cocatalyst is selected from the group consisting of triethyl aluminum, tri-isobutyl aluminum, and tri-n-hexyl aluminum.

10. The process according to claim 9, wherein the cocatalyst is added to the reactor in an amount from 10 to 40 ppm of aluminum based on the production rate of the polymer.

11. The process according to claim 10, wherein the comonomer is 1-butene.

12. The process according to claim 11, wherein the reactor system does not need to be brought down for cleaning more frequently than 28 months.

* * * * *